United States Patent [19]  [11] 3,962,205
Ward et al.  [45] June 8, 1976

[54] POLYMER MATERIALS

[75] Inventors: Ian MacMillan Ward, Bramhope, near Leeds; Giancarlo Capaccio, Leeds, both of England

[73] Assignee: National Research Development Corporation, London, England

[22] Filed: Mar. 6, 1974

[21] Appl. No.: 448,630

[30] Foreign Application Priority Data
Mar. 6, 1973  United Kingdom............... 10746/73
Oct. 3, 1973  United Kingdom............... 46141/73

[52] U.S. Cl.................................. 526/352; 528/502; 528/503; 528/481; 264/288; 264/289; 264/290 R
[51] Int. Cl.² ........................................ C08F 10/02
[58] Field of Search ............... 260/94.9 R, 94.9 GD; 450/775.5

[56] References Cited
UNITED STATES PATENTS
2,631,954  3/1953  Bright............................... 154/53.5
3,022,543  2/1962  Baird et al. .......................... 18/57
3,141,912  7/1964  Goldman et al. ...................... 264/95
3,502,639  3/1970  Statton............................... 260/94.9
3,558,580  1/1971  Orser................................ 260/88.2
3,800,008  3/1974  Starkweather ..................... 260/897 B

*Primary Examiner*—Stanford M. Levin
*Attorney, Agent, or Firm*—Finnegan, Henderson, Farabow & Garrett

[57] ABSTRACT

An oriented high density polyethylene polymer material having a weight average molecular weight of less than 200,000, a number average molecular weight of less than 20,000, a ratio of weight average molecular weight $\overline{M}_w$ to number average molecular weight $\overline{M}_n$ such that for $\overline{M}_n > 10^4$, $\overline{M}_w/\overline{M}_n < 8$ and for $\overline{M}_n < 10^4$, $\overline{M}_w/\overline{M}_n < 20$, and a Young's modulus greater than $3 \times 10^{10} N/m^2$.

9 Claims, No Drawings

POLYMER MATERIALS

This invention relates to certain new polymer materials and a process for their production.

There is a continuing demand for engineering materials having an improved combination of physical properties and, for example, a great deal of attention has recently centred around carbon fibres. Carbon fibres have a very high modulus of elasticity ($4.2 \times 10^{11} \text{N/m}^2$) but are very expensive and thus of limited application. Fibres formed from polymers such as polyethylene by conventional methods are cheaper but have a greatly inferior modulus of elasticity (about $0.5 - 0.7 \times 10^{10} \text{N/m}^2$).

The present invention provides a new polymer material having improved physical properties in this respect, and a process for its production.

According to the present invention there is provided an oriented high density polyethylene polymer material having a weight average molecular weight of less than 200,000 a number average molecular weight of less than 20,000 a ratio of weight average molecular weight $\overline{M}_w$ to number average molecular weight $\overline{M}_n$ such that for $\overline{M}_n > 10^4$, $\overline{M}_w/\overline{M}_n < 8$ and for $\overline{M}_n < 10^4$, $\overline{M}_w/\overline{M}_n < 20$, and a Young's modulus as hereinafter defined greater than $3 \times 10^{10} \text{N/M}^2$.

In another aspect the invention provides a process for the production of a polyethylene polymer material which comprises subjecting a high density polyethylene polymer having a weight average molecular weight of less than 200,000 a number average molecular weight of less than 20,000 and a ratio of weight average molecular weight $\overline{M}_w$ to number average molecular weight $\overline{M}_n$ such that for $\overline{M}_n > 10^4$, $\overline{M}_w/\overline{M}_n < 8$ and for $\overline{M}_n < 10^4$, $\overline{M}_w/\overline{M}_n < 20$ to a thermal treatment in which it is cooled from a temperature at or close to its melting point and at a rate of from 1 to 15°C per minute to a temperature at least 15°C below its melting point, and drawing the polymer at a temperature and a rate such that the deformation ratio is at least 15.

In this specification high density polyethylene means a substantially linear homopolymer of ethylene or a copolymer of ethylene containing at least 95% by weight of ethylene having a density of from 0.85 to 1.0 gms/cm³ as measured by the method of British Specification No. 2782 (1970) method 509B on a sample prepared according to British Specification No. 3412 (1966) Appendix A and annealed according to British Specification No. 3412 (1966) Appendix B (1), such as for example that produced by polymerising ethylene in the presence of a transition metal catalyst.

Preferably the polymer is allowed to cool at a rate of from 2° to 10°C per minute to a temperature of from 100° to 120°C after which it will usually be quenched i.e. rapidly cooled, to a low temperature. In a continuous process it may be possible to omit the quenching step and draw the polymer directly after controlled cooling.

Preferably the polymer has a weight average ($\overline{M}_w$) molecular weight of from 50,000 to 150,000. The number average ($\overline{M}_n$) molecular weight is preferably from 5,000 to 15,000. Preferably the ratio of weight average molecular weight to number average molecular weight is less than 18. Particularly good results have been obtained using polymers having a relatively narrow molecular weight distribution, such that for $\overline{M}_N > 10^4$, $\overline{M}_w/\overline{M}_n < 6$ and for $\overline{M}_n < 10^4$, $\overline{M}_w/\overline{M}_n < 15$. The molecular weights quoted in this specification are those measured by the gel permeation chromatography method.

Although the invention is not limited to any particular theory it is believed that by subjecting the polymer having the desired morphology, to a plastic deformation process, a very high degree of orientation of the polymer molecules is obtained. A particularly preferred plastic deformation process comprises drawing the polymer to a draw ratio of at least 15, and preferably at least 20. The polymer must of course be drawn at a speed and at a temperature such that the tension of drawing is less than the tensile strength of the polymer but sufficient to produce the required orientation by extension of the polymer material over and above any extension which may be produced by flow drawing. Preferably the draw temperature is at least 40°C below the melting point of the polymer. The draw speed is related to the draw temperature and the morphology of the polymer but is usually in excess of 1 cm. per minute and may for example, be from 10 to 20 cm. per minute, or even higher. Preferably the draw temperature is from 60° to 90°C and the draw ratio is at least 18, and preferably from 25 to 60.

It has been found that the physical properties of the polymer material can sometimes be further improved by carrying out the drawing process in incremental stages, allowing the polymer to rest between successive stages.

It is preferred to carry out the drawing process upon a polymer having a relatively small cross-section and the invention is particularly suitable for the production of fibres and films. In particular continuous filaments may be produced by melt spinning and drawing on a draw frame. For convenience the diameter of the fibre, or the thickness of the film, before drawing is preferably less than 1 mm.

In this specification the deformation ratio or draw ratio is defined either as the ratio of the final length to the initial length or as the ratio of the cross-sectional areas before and after drawing.

The process of the invention is capable of producing a polymer material having a Young's modulus as hereinafter defind well in excess of $3 \times 10^{10} \text{N/m}^2$ and in some cases at least $6 \times 10^{10} \text{N/m}^2$. The Young's modulus of a polymer material depends partly upon the method of measurement, and therefore in this specification Young's modulus is defined as being the modulus measured at 21°C by a dead-loading creep experiment, as described by Gupta & Ward in J. Macromo. Sci. Phys. B1 373 (1967), taking the 10 second response at a strain of 0.1%.

It is found that, in accordance with the process of the invention, substantially complete alignment of the polymer molecules can be obtained by plastic deformation. The molecular orientation will in most cases be uniaxial, although it is also possible with an appropriate drawing process, to produce biaxially oriented polymer materials. The presence of substantially complete orientation may be determined by physical measurements, such as for example, X-ray diffraction measurements, or nuclear magnetic resonances studies. A simple test comprises measuring the weight loss of the polymer in fuming nitric acid and this is a measure of the perfection of the polymer material. A low weight loss indicates a high degree of perfection.

The new polyethylene polymer materials of the present invention have a highly oriented structure as can be observed by X-ray diffraction and N.M.R. studies. In particular samples with a modulus above $5 \times 10^{10} N/m^2$ have a weight loss in fuming nitric acid of less than 5% after 10 days at 60°C.

A theoretical estimate for the Young's modulus of polyethylene is $24 \times 10^{10} N/m^2$ and it can thus be seen that the polymer materials of the invention have a modulus which approaches quite closely to this figure. Polyethylene polymer materials having a Young's modulus in excess of $4 \times 10^{10} N/M^2$ and often in the range $5 \times 7 \times 10^{10} N/m^2$ may be obtained by the process of the invention.

Polyethylene polymer materials according to the present invention can be produced in the form of coherent unitary structures. They are tough and not brittle, for example polyethylene fibres may be produced which have an extensibility of at least 7%, and which can be fibrillated.

The invention is illustrated by the following Examples:

EXAMPLE 1

Isotropic filaments of 0.06 – 0.07 cm diameter are obtained by melt spinning at 190°C through a 0.1 dm diameter die. The filaments are wound up on a cylinder of 5.5 cm diameter rotating at a speed of 2.3 revs/min. The cooling rate of the polymer is arranged to be 5°C per minute and the structure produced when the temperature of the polymer reaches 115°C is preserved by rapid cooling. Samples 3 – 4 cm long are subsequently drawn on an Instron tensile testing machine at 72°C with a cross-head speed of 20 cm/min for 30–45 secs. The draw ratio is determined from the variation in cross-section of the filament.

This process is undertaken with two polymers from the commercial range of BP high density polyethylene; 075-60 grade with a melt flow index of 8.0 measured at 190°C with a load of 2.14 kg, $\overline{M}_n$ of 14450, and $\overline{M}_w$ of 69100, and for comparison, Rigidex 9, with a melt flow index of 0.9, $\overline{M}_n$ of 6060 and $\overline{M}_w$ of 126600. The 10 sec Young's modulus is measured at room temperature (21°C). The 075-60 grade had a narrow molecular weight distribution, $\overline{M}_w/\overline{M}_n = 4.8$, and gives a drawn product having a draw ratio of 20 and a Young's modulus of $4.0 \times 10^{10} N/m^2$. In contrast, the Rigidex 9 has a broader molecular weight distribution, $\overline{M}_w/\overline{M}_n = 20.9$ as well as a higher $\overline{M}_w$ value, and consequently gives a drawn product having a considerably lower modulus. Continuous filaments of the above materials may be drawn on a draw frame with similar results.

EXAMPLE 2

0.05–0.07 cm thick sheets are obtained by compression moulding high density polyethylene pellets at 160°C between two copper plates. These sheets are then removed from the press and slowly cooled at a rate of 7°–9°C/min to a temperature of 100°C (measured on the surface of the copper plate) and then quenched in cold water. Rectangular samples 2 cm long and 0.5 cm wide are drawn on an Instron tensile testing machine at 75°C at a cross-head speed of 10 cm/min for 70–90 secs. The draw ratio is measured from marks on the surface of the undrawn samples spaced at intervals of 0.2 or 0.1 cm.

The polymers investigated are two different grades from the commercial range of BP high density polyethylene, Rigidex 50, with a melt flow index of 5.5 $\overline{M}_n$ of 6180 and $\overline{M}_w$ of 101450, and 140-60 grade with a melt flow index of 12, $\overline{M}_n$ of 13350 and $\overline{M}_w$ of 67800. A maximum draw ratio of 30 is measured for the Rigidex 50, and a maximum draw ratio of 37-38 for the 140-60 grade.

The 10 sec Young's modulus for representative samples is measured at room temperature and the results given in the following Table.

TABLE

| Materials | Melt Flow Index | Draw Ratio | 10 sec Young's modulus ($N/m^2 \times 10^{-10}$) strain $0.1 \times 10^{-2}$ after thermal treatment and drawing |
|---|---|---|---|
| | | | Room temperature |
| Rigidex 50 | 5.5 | 27 | 5.7 |
| Rigidex 50 | 5.5 | 30 | 6.8 |
| 140-60 | 12.0 | 28 | 5.7 |

We claim:

1. An oriented high density polyethylene polymer material having a density of from 0.85 to 1.0 gms/cm³, a weight average molecular weight of less than 200,000, a number average molecular weight of less than 20,000, a ratio of weight average molecular weight $\overline{M}_w$ to number average molecular weight $\overline{M}_w$ such that for $\overline{M}_n > 10^4$, $\overline{M}_w/\overline{M}_n < 8$ and for $\overline{M}_n < 10^4$, $\overline{M}_w/\overline{M}_n < 20$, and a Young's modulus as hereinbefore defined greater than $3 \times 10^{10} N/m^2$.

2. A polyethylene polymer material according to claim 1, having a weight average molecular weight of from 50,000 to 150,000.

3. A polyethylene polymer material according to claim 1, having a number average molecular weight of from 5,000 to 15,000.

4. A polyethylene polymer material according to claim 1, having a molecular weight distribution such that for $\overline{M}_n > 10^4$, $\overline{M}_w/\overline{M}_n < 6$, and for $\overline{M}_n < 10^4$, $\overline{M}_w/\overline{M}_n < 15$.

5. A polyethylene polymer material according to claim 1 having a weight loss in fuming nitric acid of less than 5% after 10 days at 60°C.

6. A polyethylene polymer material according to claim 1 that is uniaxially oriented.

7. A polyethylene polymer material according to claim 1 that is a fibre or a film.

8. A polyethylene polymer material according to claim 1 that is a continuous filament.

9. A polyethylene polymer material according to claim 1 having a Young's modulus in the range of from 5 to $7 \times 10^{10} N/m^2$.

* * * * *

UNITED STATES PATENT OFFICE
CERTIFICATE OF CORRECTION

Patent No. 3,962,205　　　　　　　　　Dated June 8, 1976

Inventor(s) Ian MacMillan Ward et al

It is certified that error appears in the above-identified patent and that said Letters Patent are hereby corrected as shown below:

In claim 1, line 6, "$\overline{M}_w$" (second occurrence)

is changed to read --$\overline{M}_n$--.

Signed and Sealed this

Seventh Day of September 1976

[SEAL]

Attest:

RUTH C. MASON
*Attesting Officer*

C. MARSHALL DANN
*Commissioner of Patents and Trademarks*